United States Patent [19]

Moss

[11] Patent Number: 4,830,442
[45] Date of Patent: May 16, 1989

[54] OFF-AXIS HOLOGRAPHIC INSTRUMENT ILLUMINATOR

[75] Inventor: Gaylord E. Moss, Marina del Rey, Calif.

[73] Assignee: Hughes Aircraft Company, Los Angeles, Calif.

[21] Appl. No.: 796

[22] Filed: Jan. 6, 1987

[51] Int. Cl.⁴ .............................................. G03H 1/24
[52] U.S. Cl. .................................. 350/3.7; 350/3.72; 362/23
[58] Field of Search ................ 350/3.61, 3.67, 3.69, 350/3.7, 3.71, 3.72, 3.75, 3.77, 3.78, 3.85; 340/97, 99, 103, 104

[56] References Cited

U.S. PATENT DOCUMENTS

| | | | |
|---|---|---|---|
| 3,632,181 | 1/1972 | Lee | 350/3.85 |
| 3,647,289 | 3/1972 | Weber | 350/3.85 |
| 3,807,829 | 4/1974 | Close | 350/3.72 |
| 3,901,578 | 8/1975 | Hudson . | |
| 4,140,373 | 2/1979 | Rüll | 350/3.67 |
| 4,170,396 | 10/1979 | Kraft | 350/3.78 |
| 4,245,882 | 1/1981 | Chang | 350/3.72 |
| 4,378,142 | 3/1983 | Ono | 350/3.71 |
| 4,428,643 | 1/1984 | Kay | 350/3.71 |
| 4,573,758 | 3/1986 | Hecker et al. | 350/3.78 |
| 4,592,618 | 6/1986 | Huignard et al. | 350/3.67 |
| 4,613,200 | 9/1986 | Hartman | 350/3.72 |
| 4,669,810 | 6/1987 | Wood | 350/3.7 |

FOREIGN PATENT DOCUMENTS 0097257  1/1984  European Pat. Off. .
0183128  6/1986  European Pat. Off. .
WO86/05269  9/1986  PCT Int'l Appl. .

OTHER PUBLICATIONS

Applied Optics, vol. 20, No. 15, Aug. 1, 1981, Optical Society of America (New York, US), S. K. Case et al.: "Multifacet Holographic Optical Elements for Wave Front Transformations," pp. 2670–2675.

IBM Technical Disclosure Bulletin, vol. 27, No. 7A, Dec. 1984 (New York, US), G. T. Sincerbox: "Holographic Image Converter for Optical Information Processing," pp. 3745–3746.

*Primary Examiner*—John K. Corbin
*Assistant Examiner*—Martin Lerner
*Attorney, Agent, or Firm*—John Holtrichter, Jr.; A. W. Karambelas

[57] ABSTRACT

A converter hologram providing radially symmetric exposure of coaxially located holograms from an off-axis source and displays utilizing the same.

13 Claims, 3 Drawing Sheets

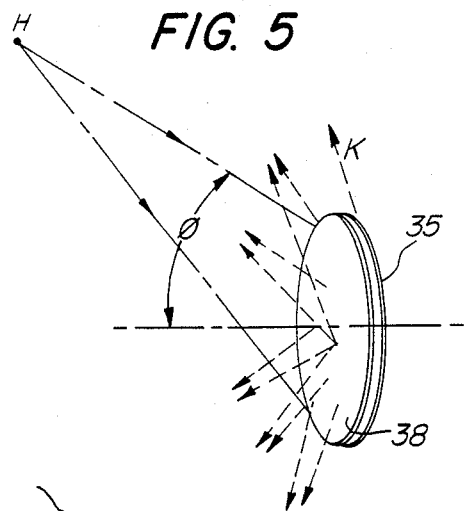
FIG. 5
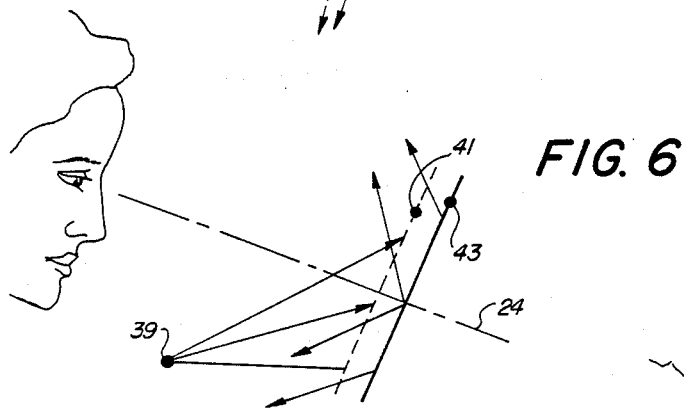
FIG. 6
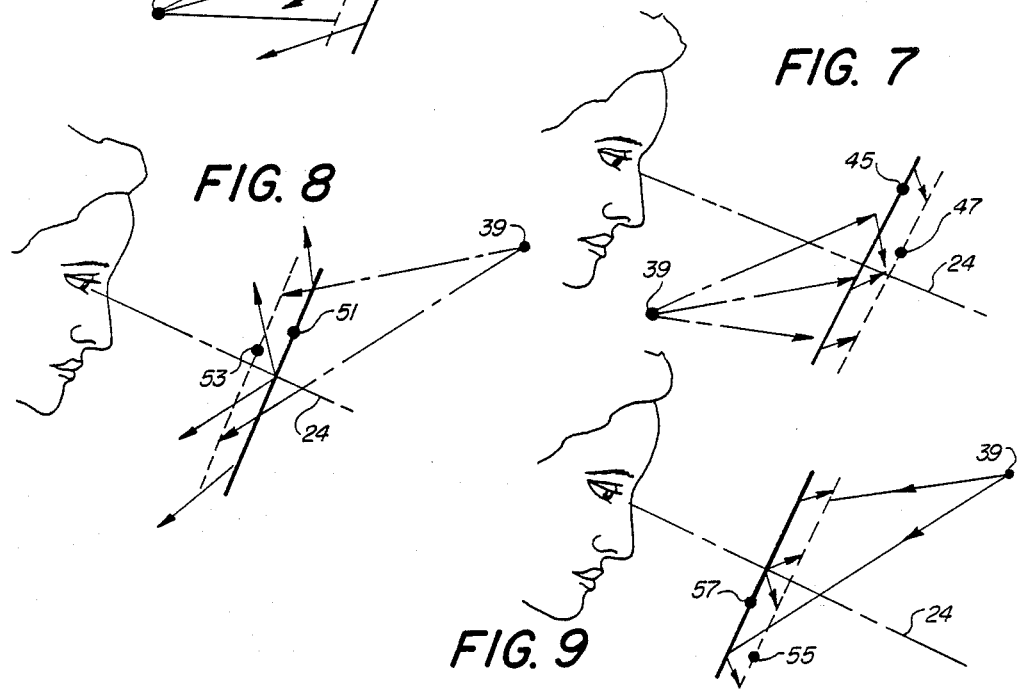
FIG. 7
FIG. 8
FIG. 9

OFF-AXIS HOLOGRAPHIC INSTRUMENT ILLUMINATOR

BACKGROUND OF THE INVENTION

1. Field of the Invention

The subject invention relates to holographic displays and, more particularly, to apparatus for converting an off-axis illumination beam into a radially symmetric on-axis beam in a holographic display.

2. Description of Related Art

In the prior art, illumination of a hologram which must rotate has taken place from a point on or close to the axis of the hologram. Since the hologram viewing direction is on this same axis, the illumination source can block the view or shine into the face of the viewer. A compromise solution is to widen the angular acceptance angle of the hologram to accept illumination from a larger off-axis angle. Increasing the off-axis angle degrades the hologram by spreading the holographic image, which lowers the brightness and increases reflections from the environment. In addition, it increases the probability of spurious illumination of the hologram from other light sources. In the case of a rotating display such as a holographically produced rotating pointer, misalignment of the pointer can result from off-axis illumination. Also, the diffraction efficiency of the hologram, that is the brightness of the image, decreases as the hologram is rotated away from the angle at which is was constructed.

SUMMARY OF THE INVENTION

According to the invention, an improved method and apparatus for illuminating a holographic display is provided. In this display, a fixed or "converter" hologram is employed to modify off-axis illumination to provide radially symmetric illumination of an on-axis hologram. The converter hologram may either reflect or transmit a radially symmetric wavefront, depending on whether the illumination source is located on the same side or on the opposite side of the hologram to be illuminated. In this manner, viewer obstruction by an on-axis source is avoided. The on-axis hologram may be an instrument hologram for generating a vehicle instrument pointer, in which case more accurate representation of the instrument image pointer is achieved, and a bright image is maintained for any angle of hologram rotation.

The converter hologram of the invention is preferably, though not necessarily, composed of a series of pie-shaped holograms which are consecutively exposed. The consecutive exposure process can be used to produce a master hologram from which low cost copies can be made on a commercial basis.

BRIEF DESCRIPTION OF THE DRAWINGS

In the accompanying drawings:

FIG. 5 is a schematic diagram illustrating the use of a master converter hologram;

FIGS. 6–9 illustrate a various optical configurations utilizing the preferred embodiment of the invention.

DETAILED DESCRIPTION OF THE PREFERRED EMBODIMENT

The following description is provided to enable any person skilled in the optical and automotive fields to make and use the invention, and sets forth the best modes contemplated by the inventor of carrying out his invention. Various modifications, however, will remain readily apparent to those skilled in the art since the generic principles of the present invention have been defined herein specifically to provide a relatively economical and easily manufactured off-axis holographic instrument illuminator.

Figure 1:
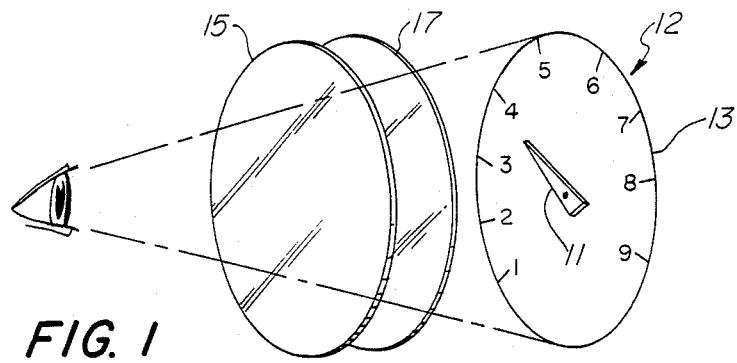
FIG. 1 is a pictorial illustration of holograms for creating a rotating pointer display.

There are some holographic displays in which it is desirable to rotate the hologram for the viewer. One such display is shown in FIG. 1, which discloses a hologram arrangement for creating a virtual image 12 of an electromechanical meter including a rotating pointer 11 on a dial face 13. The meter image 12 is created by a dial face hologram 15 and a rotating pointer hologram 17. The dial face and pointer holograms 15, 17 are conventionally constructed. Procedures for forming such holograms 15, 17 can be found in known reference works, such as "Optical Holography" by Collier et al., Academic Press, New York, N.Y. (1971). The chief problem with rotating displays such as that shown in FIG. 1 is to illuminate the pointer hologram 17 so that the pointer 11 appears the same at any rotation angle, in particular that it appears bright at any angle.

Figure 2:
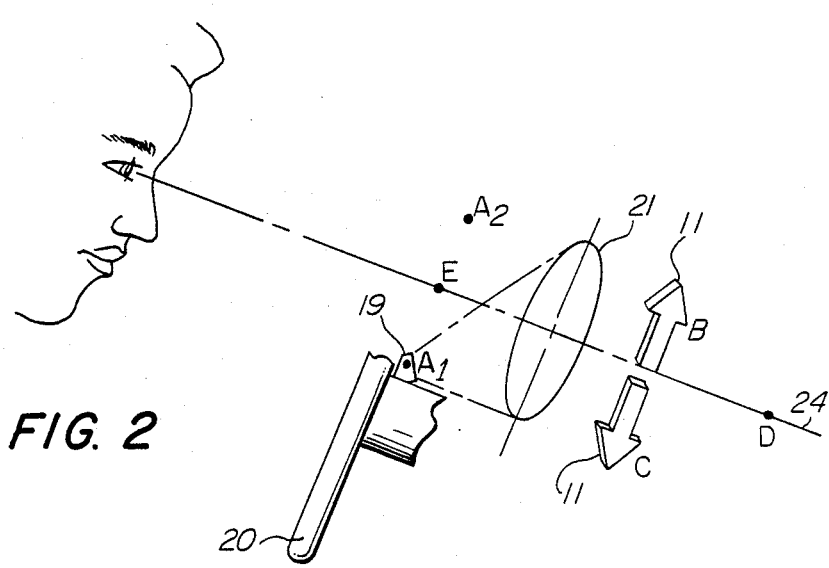
FIG. 2 is a pictorial illustration useful in demonstrating the problems overcome by the preferred embodiment.

FIG. 2 illustrates the hologram illumination problem for a hologram 21 which creates an instrument pointer 11 using an illumination source 19. The source 19 is particularly illustrated in conjunction with an automobile steering wheel 20 for directing illumination on the plane of the hologram 21. With the illumination source 19 located off-axis, such as at "$A_1$", the image of the pointer 11 can change with rotation. If the pointer 11 is rotated 180 degrees, for example, the effect would be the same as moving the illumination source to "$A_2$". The result could be a movement of the pointer image 11 from touching the axis 24, as at "B", to a position spaced from the axis 24, as at "C". At this spaced apart position "C", the pointer 11 no longer properly aligns with a fixed holographic dial face 13. Also, the pointer image would be very dim because it is now being generated by a light source that is not at the reference beam angle. The image distortion might be small enough to tolerate in an "in-plane" hologram, but becomes more severe for the deep holograms needed to provide far-sighted eye compensation. The apparent solution to the problem is to illuminate the hologram with an on-axis source, as at points "D" or "E".

However, placing the illumination source on-axis at points "D" or "E", creates other problems. For a reflection hologram, the source blocks the view of the hologram. For a transmission hologram, the undiffracted light shines directly back into the eyes of the viewer.

Figure 3:
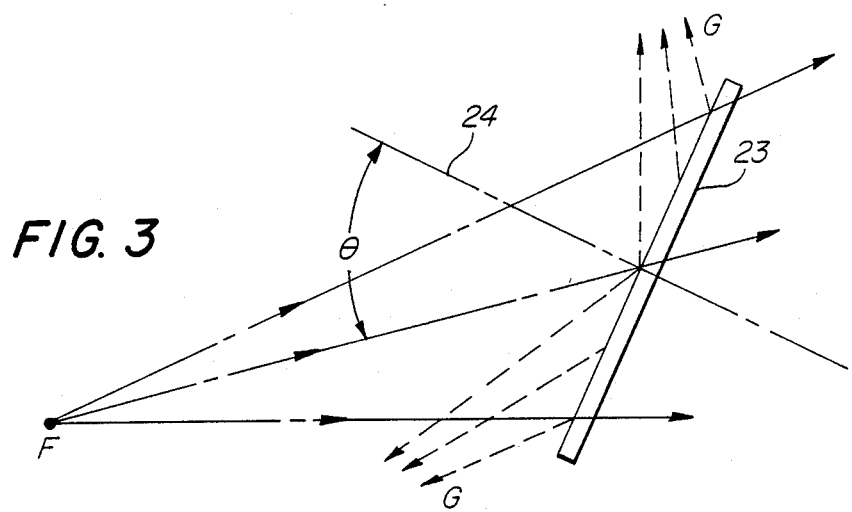
FIG. 3 is a schematic diagram illustrating a wavefront converter hologram according to the preferred embodiment.

As previously indicated, it is an object of this invention to use an off-axis illumination source to provide radially symmetric illumination by adding a fixed converter hologram which modifies the off-axis illumination. Such a hologram is shown in FIG. 3 where the light from on off-axis source "F" is converted to the rays of a radially symmetric wavefront "G" by the fixed converter hologram 23. The off-axis illumination source "F" is located at an angle $\theta$ to the optical axis 24. As will be discussed in more detail, the converter hologram 23 contains a recorded interference pattern, preferably recorded in pie shaped segments, which creates the radially symmetric wavefront.

Figure 4:
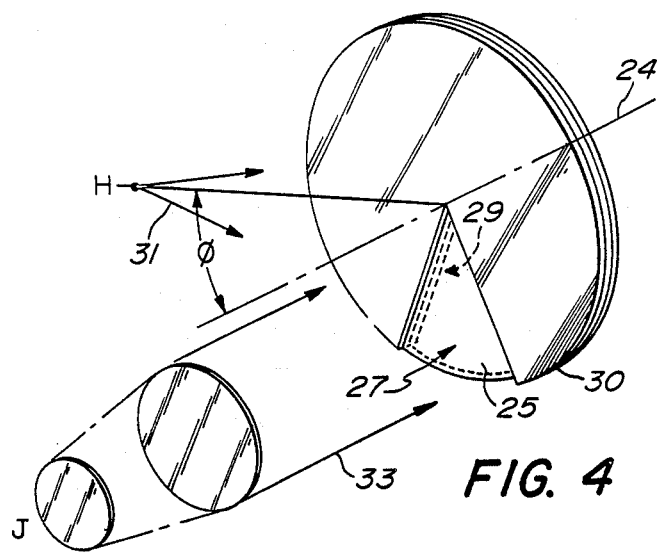
FIG. 4 is a schematic diagram illustrating the construction of a wavefront converter hologram.

The construction of the converter hologram 23 is illustrated in FIG. 4. According to FIG. 4, a hologram recording plate 25 is sandwiched by a dual mask 30 providing first and second pie-shaped openings 27, 29. The openings 27, 29 are oppositely disposed and in common alignment. The recording plate 25 and a point source H are rotated while the dual mask 30 remains stationary such that a series of congruent pie-shaped areas $a_1, a_2, \ldots a_n$ are successively exposed to two construction wavefronts 31, 33.

The two wavefronts 31, 33 are the wavefront 31 from the reference point source "H", and a radially symmetric wavefront 33 from a source "J". The point source "H" is positioned at an angle $\theta$ to the optical axis 24 equal to the angle $\phi$ between the off-axis illumination source "F" and the optical axis 24 (FIG. 3).

Figure 10:
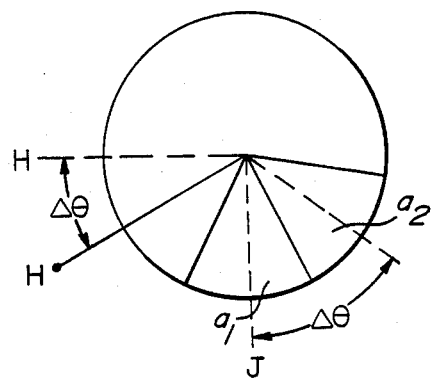
FIG. 10 is a front view of FIG. 4 perpendicular to the optical axis.

As shown more particularly in FIG. 10, prior to exposing the second pie segment $a_2$, the point source "H" is rotated by an angle $\Delta\theta$ such that the second pie segment $a_2$ receives the rays from the point source "H" at the same angle as it would if the mask 30 were removed from the unrotated recording plate 25 and the point source "H" held fixed at its original position. The angle $\Delta\theta$ is the angle between the respective bisectors 51, 53 of the equal size pie segments $a_1, a_2$.

The pie segment technique is useful in that it is difficult to provide a radially symmetric source "J" over a large area of the recording plate 25. While lines are created at the edges of the adjacent pie segments, these do not impair performance in the applications under consideration. The technique can be used to create a transmission converter hologram such as that shown in FIG. 3 by locating the radially symmetric source "J" on the same side of the recording plate as the point source "H" and conducting the same successive exposure procedure.

In order to produce converter holograms 23 with low cost and high rate, only a master hologram is exposed by the successive segment method of FIG. 4. The master is then used to produce low cost copies in the same manner as low cost point-of-sale scanner holograms are now manufactured. This technique is illustrated in FIG. 5 where a reference beam H impinges on a hologram master 35 located behind a hologram recording plate 38. In response to the reference beam, the mater 35 generates a radially symmetric object beam over the full surface of the recording plate 38.

Various converter hologram systems are possible using either transmission or reflection holograms, as shown in FIGS. 6-9. In FIG. 6, an off-axis reference beam 39 is directed onto a transmission instrument hologram 41. A reflection converter hologram 43 is located in parallel with and to the rear of the transmission instrument hologram 41 to illuminate the instrument hologram 41 with a radially symmetric reflected wavefront. In FIG. 7, the off-axis reference beam 39 is directed onto a transmission converter hologram 45. A reflection instrument hologram 47 is located behind and in parallel with the transmission converter hologram 45. Again, the transmission converter hologram 45 provides a radially symmetric wavefront to the reflection instrument hologram 47. In both FIGS. 6 and 7, the off-axis reference beam 39 is located on the same side of the instrument holograms 41, 47 as the viewer.

In FIGS. 8 and 9, the off-axis reference beam 39 is disposed on the side of the instrument holograms 53, 55 opposite the viewer. In FIG. 8, the off-axis reference beam 39 is directed onto a transmission converter hologram 51 which is disposed in parallel with a transmission instrument hologram 53. In FIG. 9, the off-axis reference beam 39 is directed onto a reflection instrument hologram 55, which is disposed in parallel with a reflection converter hologram 57. The converter holograms 51, 57 again provide a radially symmetric illumination wavefront to the instrument holograms 53, 55 in response to the light incident from the illumination source 39. It may be noted that in the embodiments of FIGS. 6-9, the holograms 41, 43, 45, 47, 51, 53, 55, 57 are all disposed perpendicular to the optical axis 24, which also comprises the line of sight.

It is possible to generate a radially symmetric wavefront by the use of conventional optical elements in those cases where space allows the use of auxiliary optics to shape the wavefronts. Compared to conventional optics, however, the holographic apparatus of the invention has the advantages of requiring less space, weight and cost.

It will be apparent from the above discussion that numerous adaptations and modifications of the invention may be made without departing from the scope and spirit of the invention. Therefore, it is to be understood that, within the scope of the appended claims, the invention may be practiced other than as specifically described herein.

What is claimed is:

1. An optical system comprising:
    a hologram disposed on an optical axis;
    an off-axis illumination source disposed at an angle to said axis; and
    hologram means illuminated by said off-axis source for projecting a radially symmetric illumination wavefront onto said hologram, said hologram means comprising a hologram recording plate having an axis, and a hologram interference pattern means recorded on said plate for projecting a radially symmetric illumination wavefront in response to illumination from a selected off-axis angle.

2. The optical system of claim 1 wherein said recorded interference pattern means includes a plurality of pie-shaped recorded segments.

3. An optical system comprising
    a transmission instrument hologram disposed on an optical axis;
    an off-axis illumination source disposed at an angle to said axis; and
    hologram means illuminated by said off-axis source for projecting a radially symmetric illumination wavefront onto said hologram, said hologram means comprising a reflection converter hologram means for reflecting a radially symmetric illumination wavefront from said source through said transmission instrument hologram.

4. An optical system comprising
    a reflection instrument hologram disposed on an optical axis;
    an off-axis illumination source disposed at an angle to said axis; and hologram means illuminated by said off-axis source for projecting a radially symmetric illumination wavefront onto said hologram, said hologram means comprising a transmission converter for transmitting a radially symmetric illumination wavefront to said reflection instrument hologram in response to illumination received from said source.

5. A display comprising:
a first hologram means disposed on an optical axis for creating a fixed display;
a second hologram means disposed on said optical axis for creating a display which rotates with respect to said fixed display;
an illumination source means disposed off said optical axis for illuminating said second hologram means; and
a third hologram means for receiving the illumination of said illumination source means and providing a radially symmetric illumination wavefront to said second hologram means.

6. The display of claim 5 wherein said hologram means comprises:
a hologram recording plate having an axis; and
a hologram interference pattern means recorded on said plate for projecting a radially symmetric illumination wavefront in response to illumination from a selected off-axis angle.

7. The display of claim 6 wherein said recorded interference pattern means comprises a plurality of pie-shaped recorded segments.

8. The display of claim 5 wherein at least one of said first and second hologram means comprises a transmission hologram and wherein said third hologram means comprises a reflection converter hologram means for reflecting a radially symmetric illumination wavefront onto said transmission hologram in response to illumination by said illumination source.

9. The display of claim 5 wherein at least one of said first and second hologram means comprises a reflection hologram and said third hologram means comprises a transmission converter hologram for transmitting a radially symmetric illumination wavefront to said reflection hologram in response to illumination received from said illumination source.

10. An optical system having a hologram display disposed on an optical axis, an off-axis illumination source disposed at an angle to said axis, and a hologram means illuminated by said off-axis source for projecting a radially symmetric waveform across substantially the entire face of said hologram display wherein said hologram means comprises:
a hologram recording plate having an axis, and
a hologram interference pattern means recorded on said plate for projecting a radially symmetric illumination wavefront in response to illumination from a selected off-axis angle.

11. The optical system of claim 10 wherein said recorded interference pattern means includes a plurality of pie-shaped recorded segments.

12. The optical system of claim 10 wherein said hologram display comprises a transmission instrument hologram and said hologram means comprises a reflection converter hologram means for reflecting a radially symmetric illumination wavefront from said source through said transmission instrument hologram.

13. The optical system of claim 10 wherein said hologram display comprises a reflection instrument hologram and said hologram means comprises a transmission converter for transmitting a radially symmetric illumination wavefront to said reflection instrument hologram in response to illumination received from said source.

* * * * *